UNITED STATES PATENT OFFICE.

ALBERT DECATUR BARR, OF BATESVILLE, ARKANSAS.

MEDICAMENT AND PROCESS OF PRODUCING THE SAME.

966,642.      Specification of Letters Patent.     Patented Aug. 9, 1910.

No Drawing.     Application filed June 19, 1909. Serial No. 503,188.

*To all whom it may concern:*

Be it known that I, ALBERT DECATUR BARR, a citizen of the United States, residing at Batesville, county of Independence, and State of Arkansas, have invented a new and useful Medicament and Process of Producing the Same, of which the following is a specification.

In application for Letters-Patent filed by me December 9th, 1908, Serial Number 466,643, I have described a stimulating antipyretic crystalline saline body and method of producing it and referred to the value of the same.

My present invention relates to a similar saline body having similar physiological effects.

I have discovered that upon treating acetanilid with the right amount of nitric acid and stopping the treatment at the proper time the nitric acid may be made to enter into combination with the acetanilid and that this combination can be rendered stable by the addition of an alkaloid which enters into chemical combination therewith, with the result that there is obtained a definite chemical combination.

The process will be readily understood from the following illustrative formula:—

To one ounce (troy) of acetanilid $$(C_6H_5NHC_2H_3O)$$

add 225 grains of nitric acid ($HNO_3$) of the strength of 68% absolute nitric acid, place in a mortar and thoroughly triturate for from five to fifteen minutes. The result of this is a combination of nitric acid and acetanilid $$(C_6H_5NHC_2H_3OHNO_3).$$

To this is added 1039 grains of anhydrous quinin $$(C_{20}H_{24}N_2O_2)$$

or its equivalent of quinin containing its water of crystallization and trituration is continued until the reaction is neutral to test paper and the mass becomes a viscid fluid. The resulting product is then treated with five times its weight of boiling water for a few minutes to dissolve out soluble bodies, the water then decanted and the product allowed to dry. The result is a definite chemical combination containing acetanilid, nitric acid and quinin groups $$(C_6H_5NHC_2H_3OHNO_3C_{20}H_{24}N_2O_2)$$

in the proportions of one part of the acetanilid treated with the nitric acid to 1.641 parts of anhydrous quinin.

The percentage analysis of the product is as follows: nitric acid, 12.05+ per cent., acetanilid, 25.861+ per cent., quinin, 62.046 per cent. The product is a crystalline saline body, insoluble or nearly so in water, soluble in about six times its weight in alcohol, and melting between 195° and 205° F.

The homogeneous viscid fluid produced after the triturating operation becomes crystalline when the temperature is reduced below 40° F. but being somewhat hygroscopic, after exposure to air it becomes fluid at a temperature between 75° and 100° F. It is insoluble in water, but when placed in water at a temperature above 59° F. it absorbs somewhat less than 3 per cent. of water and becomes a thick, heavy underlying layer of fluid. After decanting off the water it will not recrystallize except at low temperatures until this water is reëvaporated. The amount of moisture contained in quinin is sufficient to make the residue obtained after the trituration fluid above 59° F. Neutrality may be tested by dissolving a portion of the fluid in alcohol and immersing litmus paper therein, or the fluid may be tested with litmus paper direct.

In the foregoing formula I have mentioned acetanilid as the antipyretic salt. For it may be substituted one of the other antipyretic derivatives of the anilin group containing the acetic acid molecule without departing from the spirit or scope of my invention. So, too, other alkaloids may be substituted for quinin, but I prefer quinin because it gives a better balance between the heart-depressing and heart-stimulating properties of the final product.

I claim:—

1. The process of making a stimulating antipyretic, comprising triturating acetanilid and nitric acid together and adding quinin and continuing the trituration until the reaction becomes neutral.

2. The process of manufacturing a stimulating antipyretic, which comprises triturating acetanilid and nitric acid, adding quinin and continuing the trituration until the reaction becomes neutral, treating with boiling water, decanting the water and allowing the residue to dry.

3. As a new composition of matter, a stimulating antipyretic saline composition containing groups derived from nitric acid, acetanilid and quinin in substantially the proportions of 12.05 parts nitric acid, 25.86 parts acetanilid and 62.46 parts quinin, said composition having a melting point between 195° and 205° F., being soluble in six parts of alcohol and insoluble in water but absorbing sufficient water when in contact therewith to reduce the melting point materially.

4. The process of making a stimulating antipyretic composition which comprises triturating acetanilid and nitric acid together and adding an alkaloid and resuming the trituration until the reaction becomes neutral.

5. As a new medicinal composition of matter, a chemical compound derived from acetanilid and an alkaloid, said compound being a crystalline stable powder, soluble in alcohol, insoluble in water, melting around 200° F. and having antipyretic properties.

6. As a new composition of matter, a chemical compound, derived from acetanilid and quinin, said compound being a crystalline stable powder, soluble in alcohol, insoluble in water, melting around 200° F. and having antipyretic properties.

ALBERT DECATUR BARR.

Witnesses:
T. ALBERT,
J. A. KENNARD.